Jan. 1, 1952     G. A. BIERY     2,580,992
BONE EXTRACTOR

Filed June 7, 1949     3 Sheets-Sheet 1

INVENTOR.
Galen A. Biery
BY
Cushman, Darby & Cushman
Attorneys

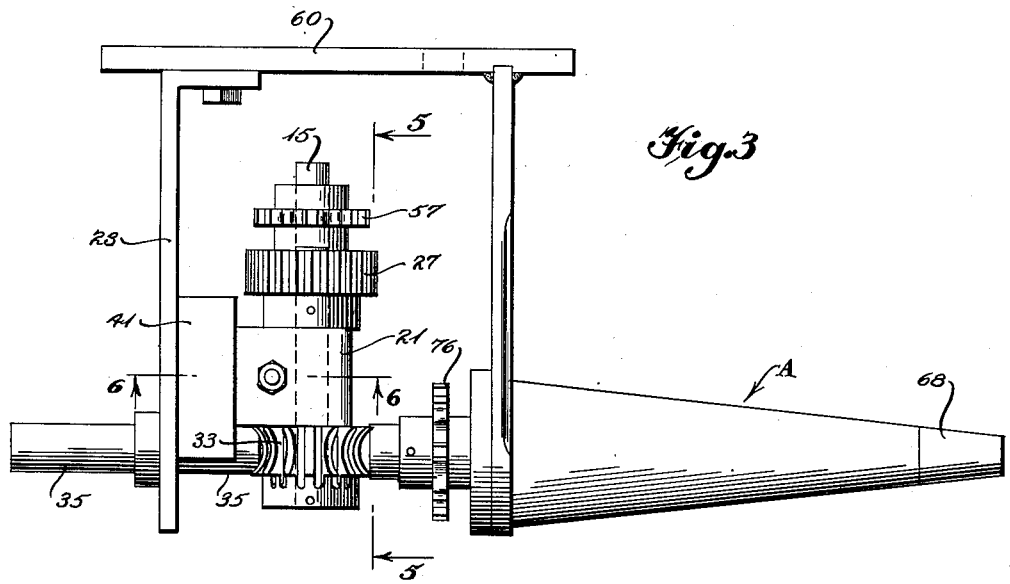
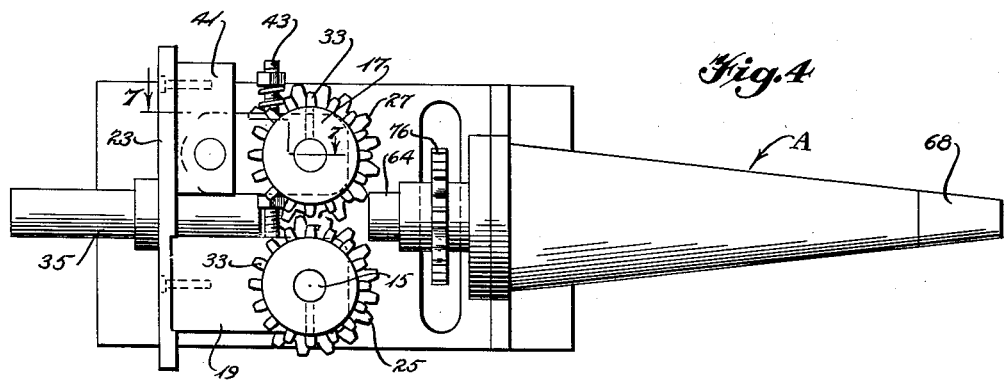
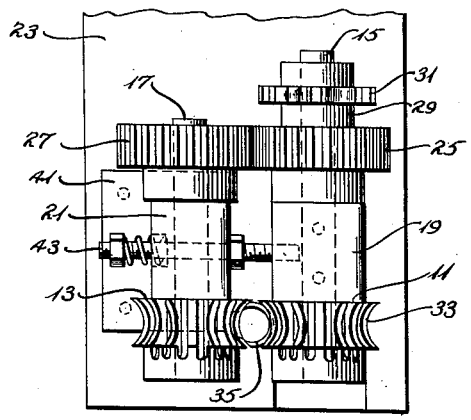

Jan. 1, 1952     G. A. BIERY     2,580,992
BONE EXTRACTOR
Filed June 7, 1949     3 Sheets-Sheet 3
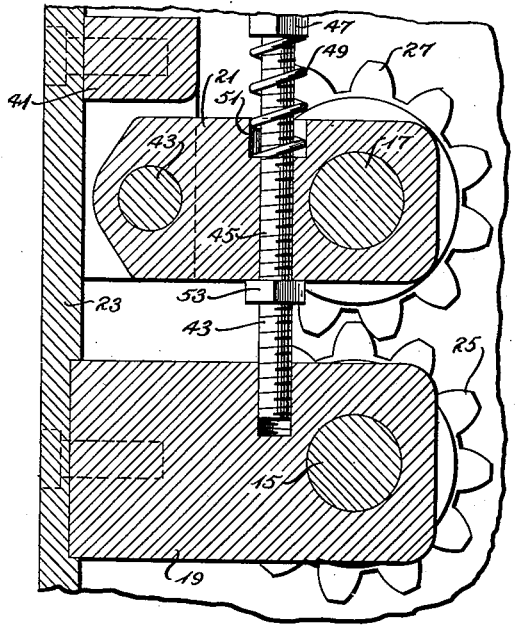
Fig. 6
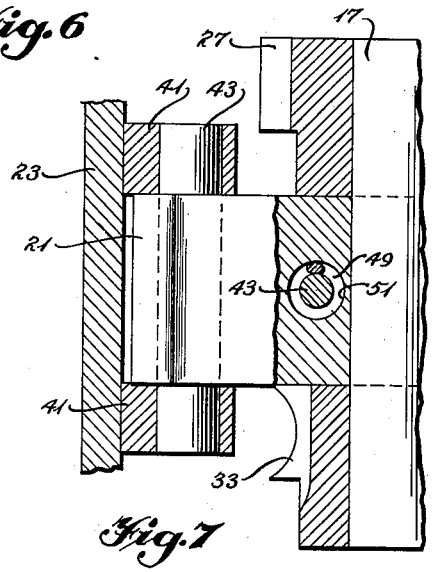
Fig. 7
Fig. 8
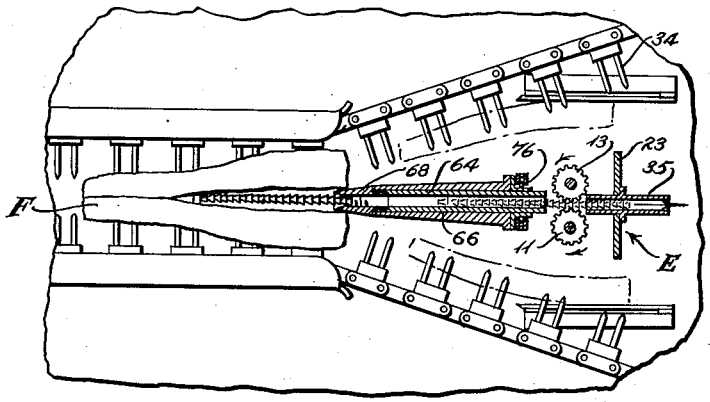
INVENTOR.
*Galen A. Biery*
BY
*Cushman, Darby & Cushman*
*Attorneys*

Patented Jan. 1, 1952

2,580,992

UNITED STATES PATENT OFFICE 2,580,992

BONE EXTRACTOR

Galen A. Biery, Bellingham, Wash., assignor, by mesne assignments, to Pacific Laboratories, Inc., Bellingham, Wash., a corporation of Washington Application June 7, 1949, Serial No. 97,619

6 Claims. (Cl. 17—3)

The present invention relates to improvements in apparatus for processing fish. A commercially successful apparatus is disclosed which effectively removes the backbone from a whole but ventrally slit fish, the said apparatus including a rotary tubular backbone removing implement with teeth thereon to cleanly remove the backbone from the fish, the backbone so removed passing through the tubular implement.

The present invention is concerned with a backbone extracting device which positively carries the removed backbone through and away from the said backbone removing implement in order to clear the latter for operation upon the next fish in the line. It will be understood that the apparatus with which the invention is concerned is adapted to successively process a great number of fish passing through the machine and at high speed. In the drawings, the invention is shown in the form of a pair of concave gear-like rotating disks positioned at the discharge end of the tubular backbone removing implement, these disks being presented toward one another and being rotated in such manner as to grip the forward end of the backbone as it leaves the tubular implement and to pull the backbone through and from the implement, in order to clear it for the reception of the backbone of the next fish in the line.

In the drawings, which illustrate a preferred form of extractor:

Figure 3 is an enlarged side elevational view of the extractor;

Figure 4 is a bottom view of the extractor, looking upwardly with respect to Figure 3;

Figure 5 is an inside end view of the extractor, as viewed from the line 5—5 of Figure 3;

Figure 6 is a horizontal view through the extractor taken along the line 6—6 of Figure 3;

Figure 7 is a partial vertical sectional view of one part of the extractor taken along the line 7—7 of Figure 4; and Figure 8 is a view illustrating the manner of operation of the extractor implement.

Figure 1:
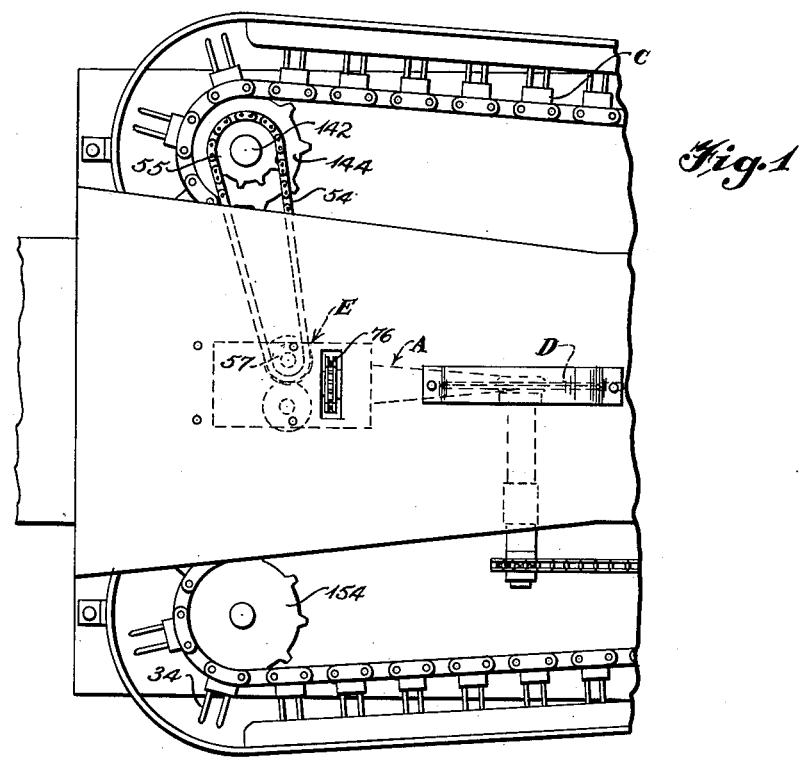
Figure 1 is a top plan view of the discharge end of the processing machine showing the position of the extractor with relation to the backbone removing implement.
Figure 2:
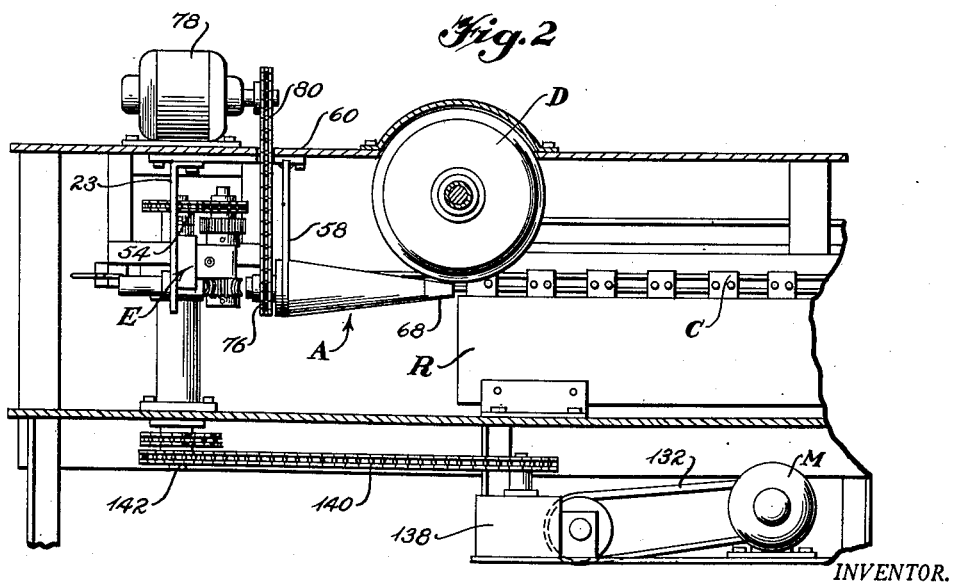
Figure 2 is a side elevational view of the extractor, with parts of the machine in section, further illustrating its position with respect to the backbone removing implement.

Referring to Figures 1 and 2, the rotary backbone removing implement of the type disclosed in the said Berglund application is shown generally at A. It is carried by a plate 58 which is bolted to and depends from an overhead supporting plate 60. The cutting element of the implement (Figure 8) comprises a driven tube 64 journalled for rotation in a longitudinal opening 66 extending through the lower thickened portion of the separating plate 58. At the forward end of this tube, there is a removable hollow cutter 68 threaded into the end of the tube. This cutter has a forward circular cutting edge and is inwardly bevelled from said cutting edge to a threaded or grooved interior which connects with the hollow bore through the tube 64, and the interior of the end 68 of the cutting implement may taper slightly outwardly to the bore of the tube 64. The outer end of the tube 64 extends beyond the end of the plate 58 and is there equipped with a sprocket 76 so that the cutting implement may be rotated at high speed from a motor 78 mounted on the frame, through the agency of a driving sprocket and a connecting chain 80.

This cutting implement rotating at high speed performs a clean cut along and around the backbone, the backbone passing through the tube 64 to discharge therefrom as shown in Figure 8. Simultaneously with the above action, the rapidly rotating dorsal slitting knife D cuts down into the dorsal side of the fish substantially to its backbone, the ventral cut having been previously made. As the backbone is thus removed and the dorsal slit is completed, the conveyor C carries the opposite fish halves outwardly into separated relationship, the backbone passing through the implement as previously referred to.

Difficulty was encountered in some instances, in that the backbone remained in the tube 64 and could not easily be pushed therefrom by the backbone of the succeeding fish entering the tube. This was due to the fact that the tail end of the backbone fans outwardly, and this tail end in some cases remained as a projection protruding outwardly beyond the circular cutter 68. In these instances, this projecting tail end of the backbone tended to deflect and mis-index the backbone of the succeeding fish. It will thus be understood that the present invention is an improvement of importance in that the power driven extractor, described below, grips the backbone and pulls it free of the cutter tube, thus keeping the latter clear in order to receive the succeeding backbone.

In Figure 1, I have designated the extractor generally by the letter E. As shown in Figure 5, it comprises a pair of disks 11 and 13 fixed for rotation respectively on shafts 15 and 17, said shafts being carried in bearing housings 19 and 21 which are secured to a bracket 23 bolted to the frame, as illustrated in Figure 3.

Fixed on the shafts 15 and 17 and above the extracting disks there are gears 25 and 27 which normally mesh with one another, and shaft 15 has a boss 29 fixed thereto which carries a sprocket 31 whereby driving power may be applied to the shaft 15 to drive the disk 11, and to in turn drive the shaft 17 and the disk 13, the latter being carried on the shaft 17.

As shown in Figure 5, the teeth on the disks 11 and 13 are concave as indicated at 33, and the parts are arranged so that the concave portions of the teeth are presented toward one another in such spaced relation as to provide a passage through the extractor for the backbone, but the teeth are sufficiently close together in order to grip the backbone and pull it through the extractor.

It will be understood that the opening provided by the teeth 33 is in exact alignment with the discharge end of the tube 64 of the backbone removing implement, as will be apparent from Figure 4, and the frame 23 carries a backbone discharging tube 35 which is in alignment with the tube of the removing implement and likewise in alignment with the opening between the concave teeth 33, as is apparent in Figure 5.

Referring to Figures 6 and 7, it will be noted that the bearing block 21 which carries the driven shaft 17 is pivotally mounted on the frame member 23, being carried in a housing 41 attached to the frame 23 and having upper and lower extensions in which is mounted the pivot shaft 43 on which the block 21 is mounted for rocking movement. The opposite bearing block 19 is fixed to the frame 23, as indicated in Figure 6.

This permissible rocking movement of the bearing block 21 with respect to block 19 permits the opening between the teeth 33 of the disks 11 and 13 to be widened in order to accommodate backbones which vary in size, yet, at the same time, providing for the gripping of these backbones by the teeth 33 no matter what their size. The degree of the opening between the teeth is controlled by a pin 43 which is fixed in the block 19 and which passes through an opening 45 in the block 21, there being a nut 47 on the end of the pin and a spring 49 which is partially carried in a well 51 in the outer wall of the block 21, this spring yieldably urging the block toward its innermost position. An adjustable nut 53 or similar provision or shoulder on the pin 43 serves to limit the inward movement of the block 21. The pivoted arrangement of the block 21, as stated, provides for expansion of the opening of the teeth 33 yet maintains the gears 25 and 27 in mesh in order to provide for the driving of the shaft 17.

The shaft 15 is driven from any suitable source of power on the machine. For instance, it is shown driven from the shaft 142 of the conveyor C, as indicated in Figure 1, through the agency of a chain 54 driven from a sprocket 55 on the conveyor shaft 142, this chain driving the sprocket 57.

The sprockets 55 and 57 are of such ratio as to impart to the periphery of the disks 11 and 13 a speed, in feet per minute, slightly in excess of that of the spiked members 34 of the conveyor that propel the fish forwardly through the machine. The disks 11 and 13 are turned in the direction shown in Figure 8 so that their teeth move toward one another and away from the outlet end of the bone removing implement, whereby the bone is grasped and rapidly removed from the tubular implement to clear its passage for the reception of the next backbone, as will be apparent from Figure 8.

I claim:

1. In apparatus of the character described, a frame, a tubular backbone removing implement mounted on said frame extending longitudinally thereof, said implement having a forward backbone receiving end and a rearward backbone discharging end, means for successively conveying fish along said frame and delivering their backbones longitudinally into the forward end of said implement to pass therethrough, a backbone extractor mounted on said frame having teeth positioned to grip the end of the backbone as it leaves said discharging end, and means to move said teeth away from said discharging end to pull the backbone through and from said tubular implement.

2. In apparatus of the character described, a frame, a tubular backbone removing implement mounted on said frame, means for rotating said implement around its longitudinal axis, said implement having a forward backbone receiving end with teeth thereon to cut around the backbone of a fish when the backbone thereof is fed longitudinally into said implement, said implement having a rearward backbone discharging end, and a backbone extractor mounted on said frame adjacent said discharging end, said extractor having backbone gripping elements positioned to engage the end of a backbone protruding from said discharging end of said implement, and means for moving said elements away from said discharging end when they engage the backbone to pull the latter from and through said implement.

3. A backbone extractor for pulling a backbone through and from the discharging end of a tubular backbone removing implement comprising a pair of members adapted to be mounted adjacent said discharging end and having opposed teeth spaced in non-meshing relationship to grip the backbone as it protrudes from said discharging end, and means for moving said opposed teeth toward one another and away from said discharging end to grip a backbone and pull it through said implement.

4. A backbone extractor comprising a pair of parallel shafts, a pair of opposed disks on said shafts having cooperating teeth thereon, the teeth on one disk being slightly spaced in non-meshing relationship from those of its companion disk a sufficient distance to receive and grip a backbone therebetween, and means for rotating said disks in opposite directions to pull a backbone longitudinally between said disks.

5. A construction in accordance with claim 4 wherein the teeth on said opposed disks are formed concave as presented to one another to receive the backbone therebetween.

6. A backbone extractor comprising a frame, a pair of disks mounted in said frame having opposed teeth spaced in non-meshing relationship from one another a sufficient distance to receive and grip a backbone presented between said disks, means on said frame for mounting one of said disks for yielding movement from and toward its companion disk upon passage of backbones of varying size between said disks and for limiting the inward movement of said one of said disks toward its companion disk, and means for rotating said disks in opposite directions to pull a backbone longitudinally between said disks.

GALEN A. BIERY.

REFERENCES CITED

The following references are of record in the file of this patent:

UNITED STATES PATENTS

| Number | Name | Date |
| --- | --- | --- |
| 2,227,356 | Lawson | Dec. 31, 1940 |